United States Patent
Nicholas, III

(10) Patent No.: US 6,865,719 B1
(45) Date of Patent: Mar. 8, 2005

(54) CURSOR MOVABLE INTERACTIVE MESSAGE

(75) Inventor: James J. Nicholas, III, New York, NY (US)

(73) Assignee: Transparence, Inc., Redwood City, CA (US)

( * ) Notice: Subject to any disclaimer, the term of this patent is extended or adjusted under 35 U.S.C. 154(b) by 698 days.

(21) Appl. No.: 09/632,474

(22) Filed: Aug. 4, 2000

Related U.S. Application Data

(63) Continuation-in-part of application No. 09/314,128, filed on May 19, 1999, now abandoned.

(51) Int. Cl.[7] ............................................. G06F 3/14
(52) U.S. Cl. ...................... 715/856; 715/864; 715/854
(58) Field of Search .................................. 345/856, 854, 345/962, 808, 809, 767, 835, 859–862, 837, 711; 715/501.1; 705/14

(56) References Cited

U.S. PATENT DOCUMENTS

| | | | |
|---|---|---|---|
| 4,358,672 A | 11/1982 | Hyatt et al. | 285/380 |
| 4,710,955 A | 12/1987 | Kauffman | 380/10 |
| 4,905,280 A | 2/1990 | Wiedemer et al. | 380/16 |
| 4,907,273 A | 3/1990 | Wiedemer et al. | 360/16 |
| 5,029,034 A | 7/1991 | Weiley | 360/132 |
| 5,319,455 A | 6/1994 | Hoarty et al. | 348/7 |
| 5,422,993 A * | 6/1995 | Fleming | 345/835 |
| 5,546,521 A * | 8/1996 | Martinez | 345/711 |
| 5,561,444 A * | 10/1996 | Johnston et al. | 345/860 |
| 5,572,643 A | 11/1996 | Judson | 395/793 |
| 5,596,750 A | 1/1997 | Li et al. | 395/671 |
| 5,673,401 A | 9/1997 | Volk et al. | 395/327 |
| 5,687,331 A | 11/1997 | Volk et al. | 395/327 |
| 5,724,521 A | 3/1998 | Dedrick | 395/226 |
| 5,737,619 A | 4/1998 | Judson | 395/761 |
| 5,752,239 A | 5/1998 | Coutts | 705/26 |
| 5,774,172 A | 6/1998 | Kapell et al. | 348/13 |
| 5,784,056 A | 7/1998 | Nielsen | 345/332 |
| 5,801,698 A * | 9/1998 | Lection et al. | 345/861 |
| 5,805,815 A | 9/1998 | Hill | 395/200.48 |
| 5,809,242 A | 9/1998 | Shaw et al. | 395/200.47 |
| 5,819,038 A | 10/1998 | Carleton et al. | |
| 5,852,440 A * | 12/1998 | Grossman et al. | 345/835 X |
| 5,886,697 A | 3/1999 | Naughton et al. | |
| 5,898,432 A | 4/1999 | Pinard | 345/334 |
| 5,966,691 A | 10/1999 | Kibre et al. | |
| 5,995,102 A | 11/1999 | Rosen et al. | 345/339 |
| 6,018,345 A | 1/2000 | Berstis | |
| 6,065,057 A | 5/2000 | Rosen et al. | |
| 6,069,633 A | 5/2000 | Apparao et al. | 345/421 |
| 6,118,449 A | 9/2000 | Rosen et al. | |
| 6,137,487 A | 10/2000 | Mantha | 345/333 |
| 6,246,411 B1 * | 6/2001 | Strauss | 345/866 X |
| 6,362,840 B1 * | 3/2002 | Burg et al. | 345/835 |

OTHER PUBLICATIONS

Microsoft PowerPoint 2000, Copyright 1987–1999, pp. 1–2.
Microsoft Word 2000, Copyright 1983–1999, pp. 1–5.

* cited by examiner

Primary Examiner—Raymond J. Bayerl
(74) Attorney, Agent, or Firm—Fliesler Meyer LLP

(57) ABSTRACT

A method for displaying an image which can include a text or graphic message on a display driven by an electronic device that includes a graphical user interface, including the steps of storing the image at an electronic device, displaying the image in relation to a cursor icon of the graphical user interface (GUI), and moving the image as the cursor icon moves in response to user commanded movement of the cursor icon so that the image stays in relation to the cursor icon. A system and method for facilitating interactive communication between a cursor icon on a display screen of an electronic device and an image transmitted to the electronic device by an application program.

3 Claims, 16 Drawing Sheets

CURSOR MOVABLE INTERACTIVE MESSAGE

This is a continuation-in-part of U.S. patent application Ser. No. 09/314,128, filed on May 19, 1999, now abandoned, incorporated by reference herein.

BACKGROUND OF THE INVENTION

1. Field of the Invention

This invention relates to an improved method for displaying messages on a display driven by an electronic device that has a graphical user interface, and more particularly to a method of displaying messages to which the user's attention will be drawn.

2. Description of the Related Art

Graphical user interfaces (GUIs) are widely used means of displaying output information on a computer or other electronic device. With the advent of high resolution video processing and larger diagonal size display technology, large amounts of information can be displayed on the computer screen at one time. Growth of usage of the global internet has been driven by creation of and demand for interactive content such as, e.g., World Wide Web pages downloaded from a server to a client computer and displayed on the client computer using the GUI and other software such as a web browser. Other content such as audio, video, streaming, and other data can be displayed using a GUI.

The advanced video processing and display technology, Internet connectivity and GUIs enable large amounts of information content to be sent to and displayed to a client user. For example, web pages can contain large amounts of interactive content such as text, images, animation, video, audio and hyperlinks to other content. Examples of hyperlinks can include underlined text or graphical images which can be selected to branch to the other content.

Included in such interactive content can be, e.g., advertising content such as, e.g., ad messages. Ad messages permit the client user to "click-through" to the sponsor of the web page by selecting a hyperlink. Advertising servers can be used to track client user traffic and to present targeted ad messages within a web page, by using such technologies as "cookies," ad servers, and demographic global profiling services such as, e.g., ProfileServer 4.0 available from Engage Technologies, Inc. of Andover, Mass., and DART available from DoubleClick. Advertising revenue can be used to support further content development.

Unfortunately, conventional web sites provide such vast amounts of data on a given web page that advertising messages or "trees" can be lost in the "forest" of information provided by a web page to the client user. Evidence of the ineffective reach of conventional Internet advertising messages is seen in the decreasing click through rates observed by traffic companies. Similarly, in television applications, viewers often tape programs and use fast-forwarding technology to skip commercials. Attempts to respond to the challenge of providing advertising and other messages that are not easily overlooked have unfortunately fallen short. For example, pop up web pages, such as those provided by free web hosting sites are intrusive and are often closed by client users leaving negative rather than positive impressions. These self-appearing screens, or dialog boxes (i.e. Windows), are even more problematic for the users of a running application or network-based service since dialog boxes take control of the desktop environment for a specific period of time and interrupt the continued operation of any running application or network-based service. Users, especially those working in highly productive environments such as network management or any other mission critical environment (e.g., nuclear power plant, emergency medical facility, call centers, etc.) are subject to on-going applications and/or service interrupt whenever new information, messages or other data are displayed on the display screen of their particular electronic device. To complicate matters, the message area of self-appearing screens, or dialog boxes (e.g., Windows), often command a large portion of on-screen "real-estate" or space and can prevent a user from achieving greater productivity and data visibility within a particular computing environment.

Graphical user interfaces (GUIs) include a cursor icon, such as, e.g., a mouse pointer, to permit a user to click on particular information. Comet Cursor, available from Comet Systems, Inc. of New York, N.Y., provides a cursor icon which can be presented as a corporate logo, for example. Unfortunately however, the Comet Cursor is limited to only the 32 by 32 pixel-sized cursor icon area. Also, the cursor lacks a provision to enable a user to act upon an impulse to purchase or to gather additional information about the company or product represented by the cursor icon in the shape of a corporate or product logo.

Accordingly, there is a need for an improved message and advertising delivery system that can focus a user's attention on the message and/or advertising material while ensuring that the user's ability to perform traditional functions is not impeded. There is a further need for an improved cursor icon system which can permit a client user to take action based on content shown on a cursor icon. There is also a further need for an improved messaging display and delivery system that can enable a user to conveniently receive and access data and related applications, and collaborate with other users, without interfering with the operation of running applications or services.

SUMMARY OF THE INVENTION

A feature of this invention is the provision of a method for displaying messages such as advertising messages on an electronic device's display or content viewing device (e.g., a television, a computer or a TV set top box) which draws the attention of the user to the message. A related feature of the invention draws attention to the message with little or no distraction of the user from his or her overall operation.

A further advantage of the invention is the provision of an improved method for displaying messages while materials are being downloaded from, e.g., a World Wide Web server or other server to a client.

Still another advantage of the invention is the provision to allow a user to access directly a web site linked to the message and/or to access an expanded or enlarged version of the message.

Briefly, this invention contemplates the provision of a method in which a message is displayed in relation to or adjacent to the cursor icon on a computer driven display with a graphic user interface. In response to user commanded movement of the icon, the message moves as the icon moves, staying in relation to or adjacent to it so that the message stays with the user's focus of attention. This message or cursor movable interactive message is referred to herein as an image, a message or a trailing message. The message can automatically disappear when it would distract the user. In a specific embodiment of the invention, the message is an advertising message, which can be downloaded and updated from particular locations on the World Wide Web.

In a detailed example embodiment, a method for displaying a message on a computer, a television, a handheld device (e.g., a personal digital assistant), a wireless device (e.g., mobile/cellular phone, Wireless Application Protocol enabled mobile phone), or other electronic device driven display that includes a graphical user interface, including the steps of storing the message at a computer or other electronic device, displaying the message in relation to or adjacent to a cursor icon of the graphical user interface (GUI), and moving the message as the cursor icon moves in response to user commanded movement of the cursor icon so that the message stays in relation to or adjacent to the cursor icon, is described.

In another embodiment, the method further includes a step of extinguishing the message when the message could distract the user. In an alternative embodiment, the method further includes repositioning, reorienting, dissolving away, fading, or vanishing from, display of the message for a period of time when the cursor icon is placed over an on-screen area. In another embodiment, the message area includes an input field, an edge of the display, a hyperlink text field, a hyperlink image, a program icon, or a program button.

In another embodiment, the message can include a distinctive image. In yet another, the distinctive image features a stop sign, another geometric polygon, or a trademarked shape.

In one embodiment, the method further includes the step of reorienting the message for a period of time, when the cursor icon is placed over an on-screen area. Another embodiment includes a reorienting step with a feature that moves the message toward a center point of the GUI when the on-screen area is an edge of the display.

Another embodiment of the invention includes a method for enabling a user to hyperlink from a message displayed on a cursor icon of a graphical user interface (GUI) for a computer or other electronic device, including the steps of storing the message on the computer or other electronic device, displaying the message as part of the cursor icon of the GUI, and enabling the message of the cursor icon to link to hyperlinked information. In another embodiment, the hyperlinked information provides more detailed information. In yet another embodiment, the hyperlinked information links to an additional site.

In another embodiment, the message includes an advertisement. Another embodiment includes a message having an instruction explaining how the user can link to the hyperlinked information.

The present invention, roughly described, also provides a method for enabling a positional identifier to interact with an animated element in a trailing message on a display screen to become an interactive part of an application program linked to the animated element. The method enables users to integrate enhanced alert notification and messaging functions into any existing application program without any substantial redevelopment costs. Significantly, the trailing message is used as an interactive data "receptacle" or utility or notification agent that runs in the background of an electronic device to alert and notify a user of an event without interrupting a given application program and/or network service currently being used by the user. Thus, the trailing message is used to receive, send and respond to any type of aggregate data and display such data in the individually animated "ghost" window or object positioned in relation to the cursor icon.

The message area remains invisible to the user's eye (i.e. an interactive ghost window or object) and the message, for example, is displayed on an as needed basis in response to any activity on an electronic device, network, or other specified data source. The method thus provides users with, non-intrusive, real-time notification and messaging capability in any given computing environment where the receipt of new data does not necessarily result in work stoppages until the user wishes to act on the notification or message. When the user wishes to respond, the method provides users with direct access to the original application program that triggered the notification or message. The method provides users with a more integrated environment for improved information exchange and collaboration and enables continuous applications/service availability and maximum event/data visibility and transparency for increased user convenience.

In one aspect, direct access to the original application program that triggered the alert notification is enabled via a touch screen. In a further aspect, direct access to the original application program is enabled via voice activation (i.e., IVR technology). In yet a further aspect, the method is implemented in a Wireless Application Protocol (WAP) enabled environment to facilitate real-time, two-way notification, messaging and data capability with any Internet enabled device or other networked appliance.

The present invention can be implemented using software, hardware, or a combination of software and hardware. When all or portions of the present invention are implemented in software, that software can reside on a processor readable storage medium. Examples of an appropriate processor readable storage medium include a floppy disk, hard disk, CD-ROM, memory IC, etc. The hardware used to implement the present invention includes an output device (e.g., a monitor or printer), an input device (e.g., a keyboard, pointing device, etc.), a processor in communication with the output device and processor readable storage medium in communication with the processor.

The processor readable storage medium stores code capable of programming the processor to perform the steps to implement the present invention. In one aspect, the present invention may comprise a dedicated processor including processor instructions for performing the steps the implement the present invention. In a further aspect, the present invention can be implemented on a web page on the Internet or on a server that can be accessed over communication lines. These and other objects and advantages of the invention will appear more clearly from the following detailed description in which a preferred embodiment of the invention has been set forth in conjunction with the drawings.

BRIEF DESCRIPTION OF THE DRAWINGS

The foregoing and other features and advantages of the invention will be apparent from the following, more particular description of a preferred embodiment of the invention, as illustrated in the accompanying drawings.

DETAILED DESCRIPTION

The preferred embodiment of the invention is discussed in detail below. While specific implementations are discussed, it should be understood that this is done for illustration purposes only. A person skilled in the relevant art will recognize that other components and configurations may be used without parting from the spirit and scope of the invention.

Figure 1:
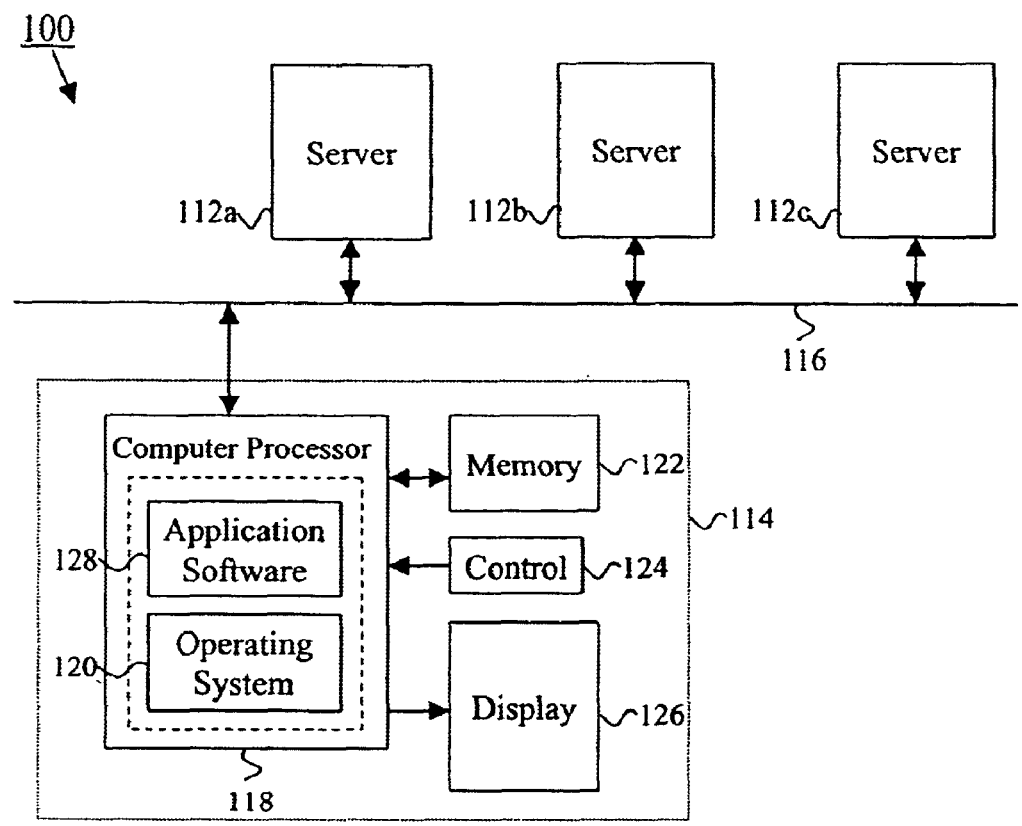
FIG. 1 is a block diagram of a client server network typical of World Wide Web client server network.

Referring now to FIG. 1, it illustrates a prior art client-server architecture 100 with multiple servers 112a, 112b, 112c and a client 114 coupled over a network 116. As will be appreciated by those skilled in the art, the system shown in FIG. 1 can represent the world wide web client-architecture where the network 116 is the Internet. The client system 114 can include processor and interface hardware 118, an operating system 120 with e.g., a graphical user interface (GUI) 128, application programs such as a web browser, (e.g., a Microsoft Internet Explorer browser), a memory 122, and an interface control 124 (e.g., a mouse), and a display 126. Client 114 is described further with respect to FIG. 10 below.

Figure 2A:
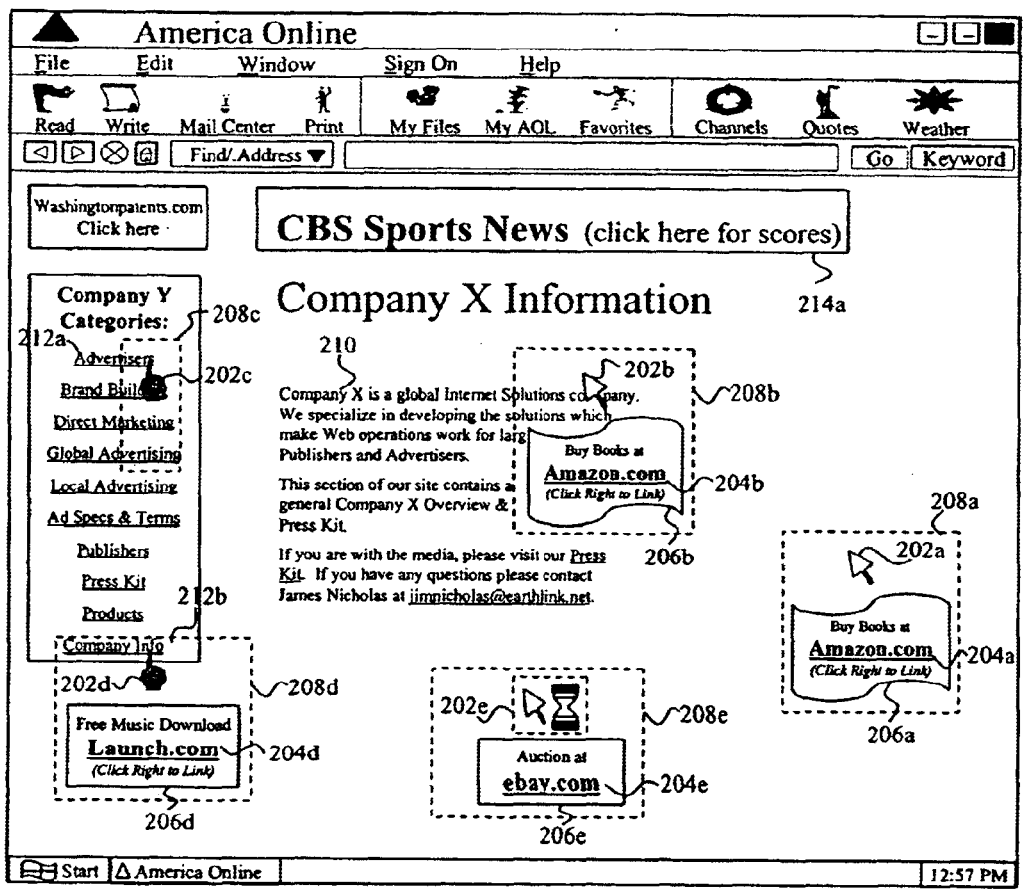
FIGS. 2A through 2C are a series of exemplary pictorial representations of a display driven by a computer or other electronic device with a graphical user interface, illustrating the appearance and movement of messages in response to the cursor icon movement and position.

Referring now to FIG. 2A, it shows a typical web page 200 that has been downloaded from one of the servers 112a–c, and stored in client memory 122. The processor 118 causes the page 200 stored in memory 122 to be displayed on the display 126 as shown in FIG. 2A. The display of cursor icon 28a can be controlled by, e.g., operating system software 120 and browser 128 in response to inputs from controller 124. In one embodiment, in relation to or adjacent to cursor icon 202a, but separate and visually distinct from the cursor icon 202a, is a message 204a. In this specific embodiment, message 204a is an advertising message and can have a distinctive message image 206a. As illustrated in FIG. 2A, the cursor icon 202a is at rest and is located outside any web page text 210 or graphic material 214a on the display 126 so that the message 204a is unlikely to be distracting to the user. Here it should be noted, the area of the message image 206a is in the preferred embodiment of the invention, several times larger than the area of the cursor icon 202a.

As also shown in FIG. 2A, as the position cursor icon 202a moves across the display 126 in response to user inputs from controller 124, the message image 206a and message 204a move with the icon 202a, collectively representing a cursor movable interactive message is referred to below as a trailing message 208a. Trailing message 208a as it moves is shown as a trailing message 208b. Trailing message 208b can overwrite the web page material 210, 214a along the moving path (here text) so that the message 204b can be read by the user as the icon 202b moves. As shown in FIG. 2A, when the user positions the cursor icon 202b at an active link 212a, the message 204b can be removed from view on the screen as it could be distracting to the user trying to read page 200, and an alternative pointer 202c can appear. Note that trailing message 202c has no corresponding message 204c, in one embodiment. In an alternative embodiment, cursor icon 202d can be placed at a text link 212b, where icon 202d is part of a trailing message 208d. Trailing message 208d can include a message image 206d containing a message 204d. In one embodiment message 204d can change on a periodic or other time basis or after occurrence of an event such as, e.g., a mouse click. The shape of image 206d can be the same or different from image 206a.

Continuing with describing FIG. 2A, after a user "clicks" on the link 212a, 212b, as the new page 220 (shown in FIG. 2B below) is downloaded (i.e. during the download period) a new message 204e or the previous message 204d automatically can appear in relation to or adjacent to, and in one embodiment separated from, the cursor icon 202e. The message 204d, 204e that automatically appears can be targeted to the user based on the particular link 212a, 212b on which the user "clicked".

Figure 2B:
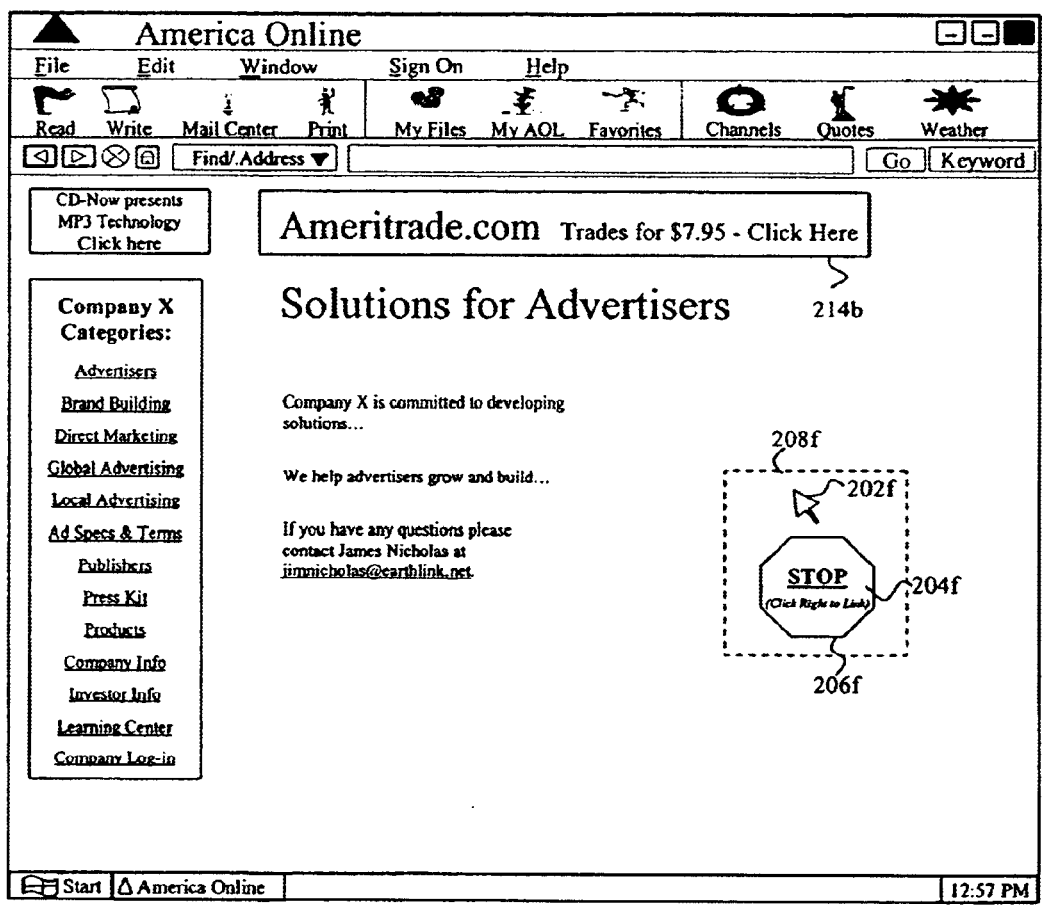

As shown in FIG. 2B, once the download period of web page 220 has been completed, the message 204f can again be changed automatically if desired, or the message 204d, 204e during the download period can be maintained. In one embodiment, message 204f can be selected to provide the same advertiser (not shown) or a competitor (shown) as already included on web page 220, such as, e.g., the advertiser in hyperlink image 214b. Image 206f of trailing message 208f is shown having a distinctive stop sign shape. In an alternative embodiment, image 206f can vary in shape and can include, e.g., animation and graphics.

Figure 2C:
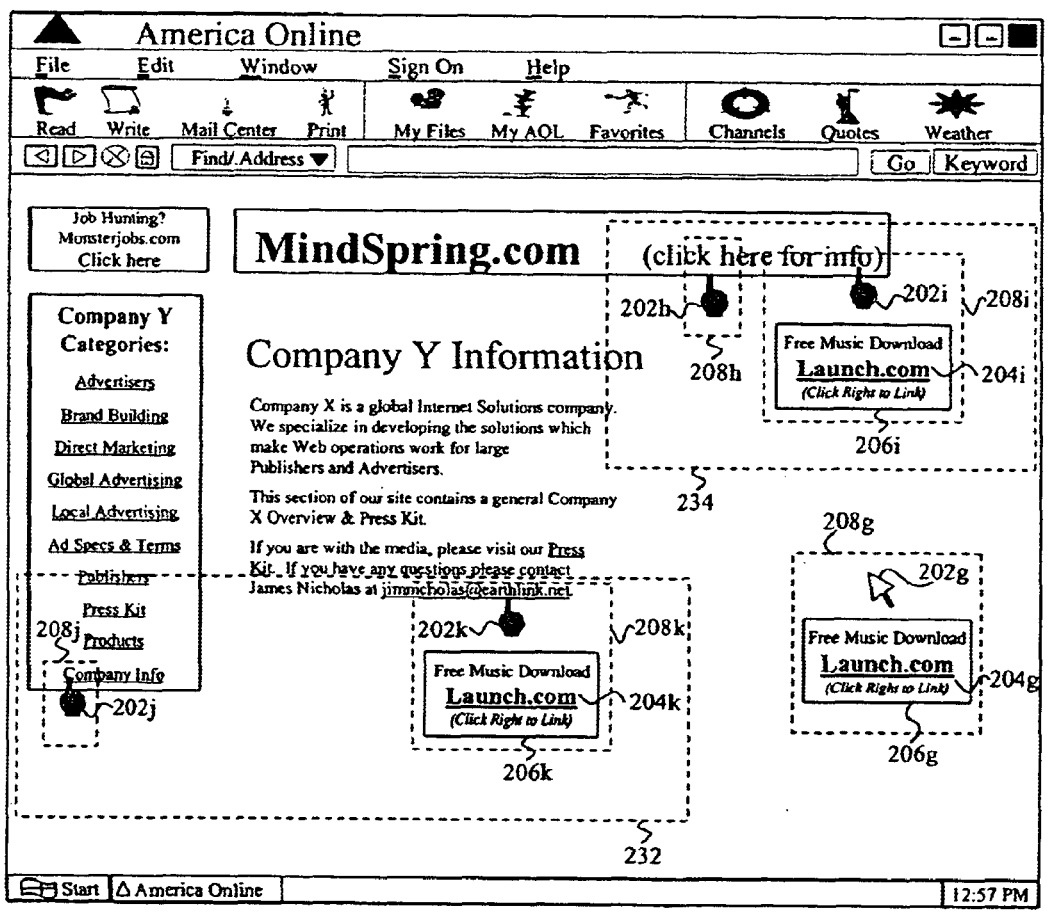

FIG. 2C depicts a pictorial representation of a web page 230 illustrating example views of behavior of messages 232 and 234, when placed over hyperlink text and hyperlink images, respectively. FIG. 2C includes an example trailing message 208g having a mouse cursor icon 202g, a message 204g and message image 206g. Trailing message 208g includes instructions indicating how to link to it within message text 204g.

When the cursor icon 202g is placed over certain on-screen areas, message 204g can disappear for a period of time. For example, if trailing message 208g is moved over a text hyperlink, mouse cursor icon 202g can change and message 204g can disappear from the display screen 126. In one embodiment, if the mouse pointer 202g is placed on a hyperlink, the image 206g can automatically disappear, as illustrated by trailing message 208j which includes mouse cursor icon 202j and no message. In an alternative embodiment, message 204g can be modified in some way, such as, e.g., fading, becoming transparent, and changing in size.

The trailing message can be displayed in a standard format as trailing message 208g. If the user decides to click on the "Company Info" link at the bottom left of the web page 230, then the user can place the cursor icon on top of the "Company Info" link. As soon as the mouse pointer 202g is placed over the linked text, the trailing message 204g can disappear (as shown with cursor 208j) or can continue to be displayed in a standard format (as shown with trailing message 208k).

Another example of where the message 204g can disappear from the display screen can occur when mouse pointer 202g is placed over a hyperlink image. For example, cursor 208h including mouse cursor icon 202h is shown having no message. Image 206g can in one embodiment disappear for a period of time. In another embodiment, message 204g can automatically return to view after mouse cursor icon 202h is removed from the hyperlink image. In yet another embodiment, message 204g can return as in the previous embodiment, but it can return with a different advertisement.

The trailing message can be displayed in a standard format as trailing message 208g. If the user decides to click on the "MindSpring.com" message at the top of the page, then the user can move the cursor icon upward and place the cursor icon on top of the message as shown for trailing message 208i. As soon as the cursor is placed over the ad message, the trailing message can disappear (as shown with cursor 208h) or can continue to be displayed in a standard format (as shown with trailing message 208i).

Figure 3:
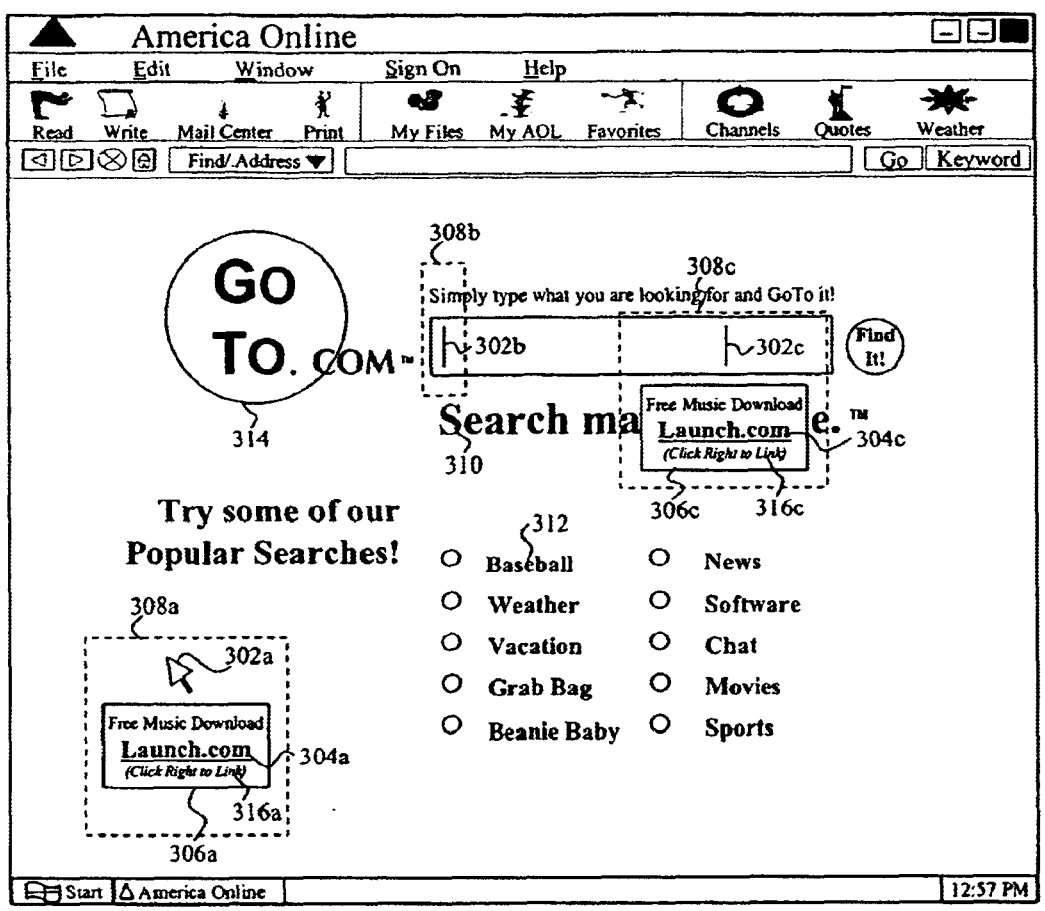
FIG. 3 is an example pictorial representation of a repositioning trailing message and a text input field.

FIG. 3 is a pictorial representation of a web page 300 illustrating an example of a trailing message, where the message can reposition itself when the cursor icon is placed over designated typing spaces (e.g., the query field of a search engine's web page). FIG. 3 includes trailing message 308a having a mouse cursor icon 302a, message 304a, message image 306a and instructions for linking to trailing ad hyperlink web site 316a. Web page 300 also includes text 310, hyperlink text 312 and hyperlink image 314. In one embodiment of the invention, when trailing message 308a is moved over a data input region, mouse pointer 302a changes into a vertical line 302b, 302c.

The trailing message can be displayed in a standard format as trailing message 308a. If the user decides to conduct a search at web page 300, then the user can place the mouse cursor icon 302a into the space designated for typing text input queries. As soon as the mouse cursor icon 302a is placed over a designated typing space, the trailing message can either disappear (as shown with cursor 308b, where mouse cursor icon 302b has changed and no message is displayed covering web text 310) or can continue to be displayed in a standard format (as shown with trailing message 308c). In one embodiment, image 306c and message 304c can be resized so as to minimize or avoid interference with text 310. In the case of trailing message 308c, the message 304c can continue to follow the cursor icon 302e while the user types information into the space designated for typing on the web page 300.

Figure 4A:
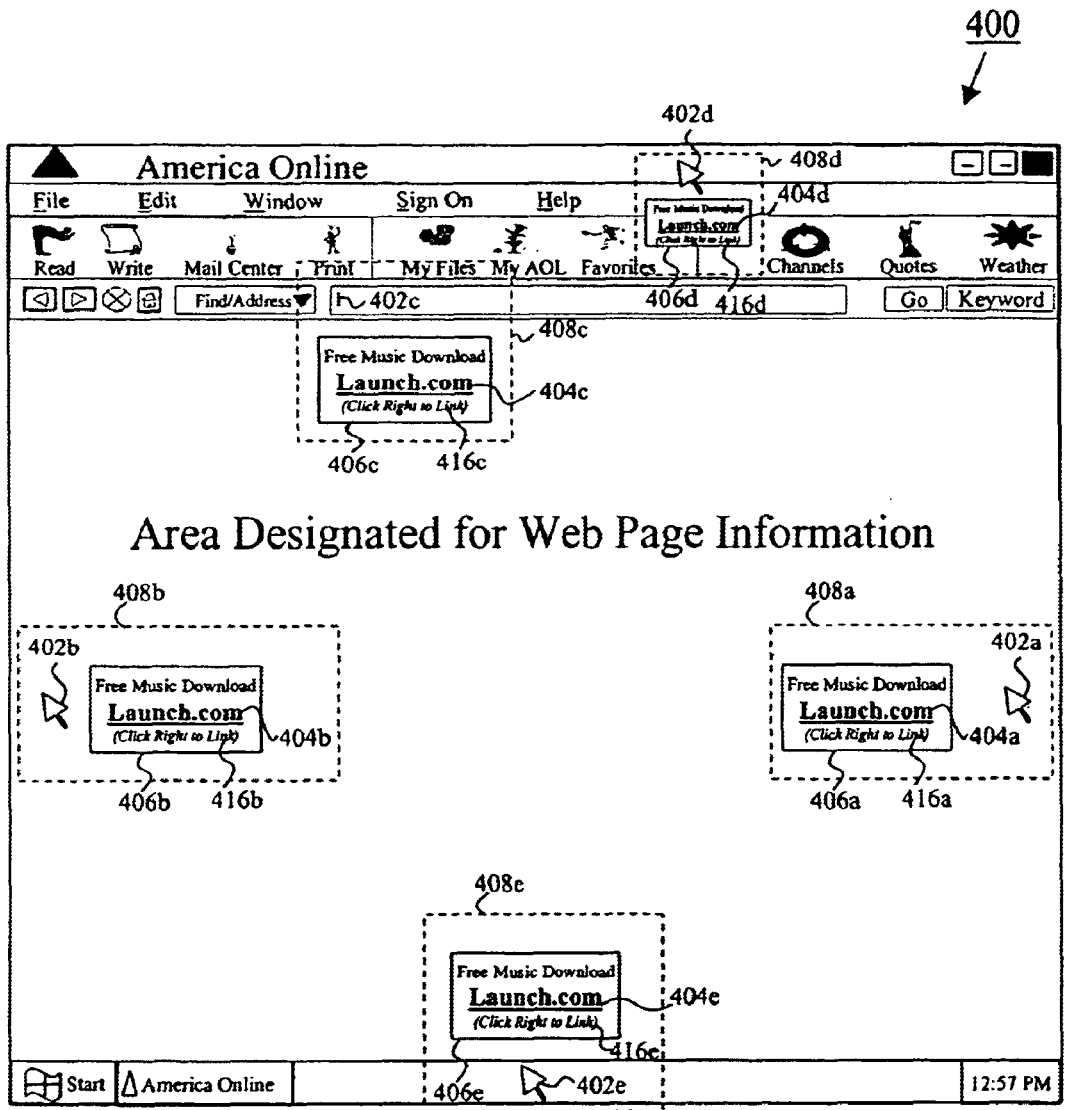
FIG. 4A is an example pictorial representation of a center reorienting trailing message.

FIG. 4A is a pictorial representation of a display screen 400 illustrating an example of a trailing message 408, where the message can reorient its position for a period of time when the cursor icon is placed over certain on-screen areas, such as, e.g., the edge of the display screen. There can be space beyond the edges of a web page that can provide the user with control and command information. These areas are displayed in FIG. 4A, where an America Online (AOL) browser has been maximized, as the areas outside of the box labeled "Area Designated for Web Page Information" (such as, e.g., the top, bottom and sides of display screen 400).

FIG. 4A shows some examples of alternative on-screen positions of trailing ad messages 408. When the cursor icon 402 is positioned such that message 404 can be partially or fully outside the display area of the web page, trailing message 408 can reposition message 404 toward the center of the web page of display screen 400. As depicted in FIG. 4A, as trailing message 408a, including mouse cursor icon 402a, message 404a, image 406a and link instructions 416a, moves to the position of trailing message 408b, message 404a automatically can move to the center of the display side of mouse pointer 402b as shown by message 404b, image 406b and instructions 416b.

As also shown in FIG. 4, as trailing message 408b, including mouse cursor icon 402b, message 404b, image 406b and link instructions 416b, moves to the position of trailing message 408c, message 404b automatically can move to the center of the display side of mouse pointer 402c (which has changed to a data input type mouse pointer) as shown by message 404c, image 406c and instructions 416c. As trailing message 408c, including mouse cursor icon 402c, message 404c, image 406c and link instructions 416c, moves to the position of trailing message 408d, message 404c automatically can reposition and resize itself to minimize interference of message 404c with underlying graphic images and/or text. Trailing message 402d is shown after resizing and repositioning, including mouse pointer 402d (which has changed back to a standard arrow type mouse pointer), message 404d, image 406d and instructions 416d.

Finally in FIG. 4A, as the trailing message 408d, including mouse cursor icon 402d, message 404d, image 406d and link instructions 416d, moves to the position of trailing message 408e, message 404d automatically can move to the center of the display side (i.e. vertically on top) of mouse pointer 402e as shown by message 404e, image 406e and instructions 416e. When the cursor icon 402e is positioned in a space considered beyond the confines of the web page, the position of trailing message 404e can, e.g., be reoriented in relation to the cursor, be repositioned, be resized, and disappear altogether.

Figure 4B:
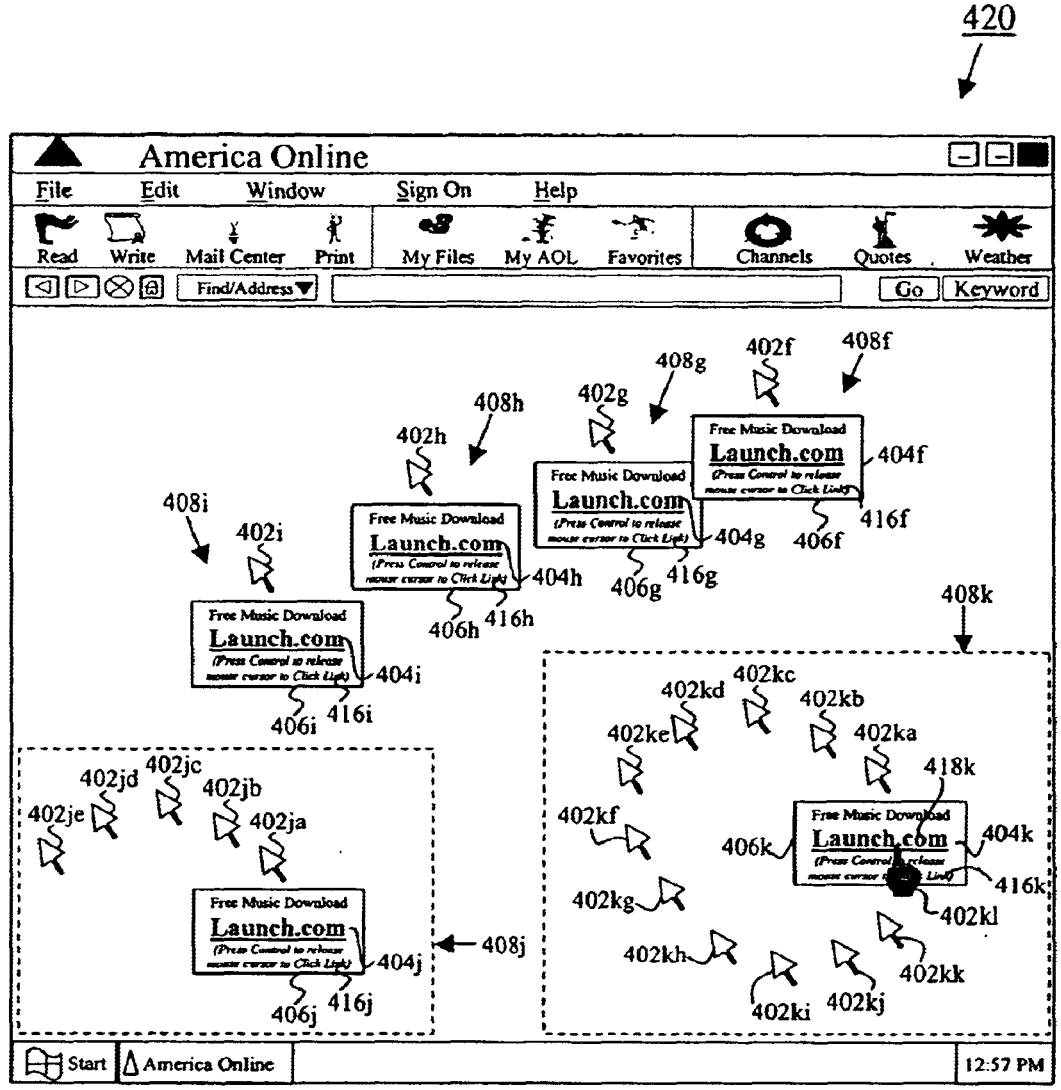
FIGS. 4B and 4C illustrate an example pictorial representation of releasing a cursor from a message thereby enabling a user to use the cursor icon to click on hyperlinked information in the message.
Figure 4C:
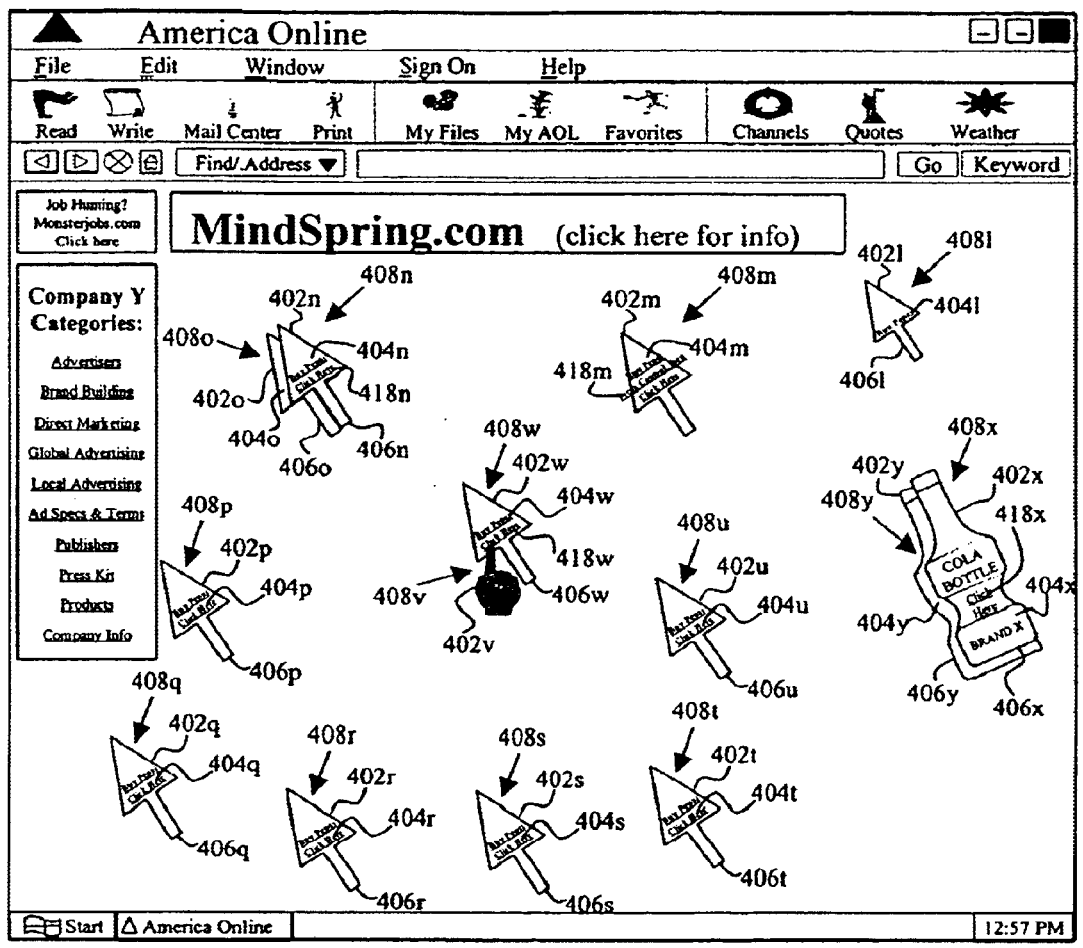

Various methods can be used to link to hyperlinks in a trailing message. The user can be prompted by instructions included in the message. One exemplar method of linking to a hyperlink uses a pressing of a key or a combination of keys in order to release the cursor icon from the message to permit the clicking of the cursor icon onto a hyperlink of the message to activate the link. In a specific example embodiment of the invention, an instruction can be provided to the user instructing how to release the cursor icon fusing, (using, e.g., the control key to release the cursor) from the message to permit using the cursor icon to select a link of the message to hyperlink information. FIGS. 4B and 4C illustrate example pictorial representations of releasing a cursor from a message enabling a user to click on hyperlinked information in the message using the cursor icon.

FIG. 4B depicts a pictorial representation 420 of an exemplary trailing message 408f including a cursor icon 402f, message 404f, image 406f, and instructions 416f indicating how to link to the site contained in message 404f of the trailing message 408f. The user can be prompted by the instructions 416f included in the message 404a. FIG. 4B illustrates an example method of linking to a hyperlink using the pressing of a key or combination of keys in order to release a cursor icon 402f to permit the cursor icon to click onto the trailing message 408f to activate a hyperlink 418f.

Trailing message 408f illustrates normal movement of a trailing message from a position (f) to a position (i). In this embodiment, message 404f, with image 406f and instructions 416f, moves in relation to or adjacent to cursor icon 402f as illustrated by message 404g, 404g and 404i. In order to create the ability to "point and click" on the trailing message 404*f*–404*i*, a user can depress a key or combination of keys which are configured to release the cursor icon from the trailing message or banner. For example, trailing message 408*j* illustrates an example pictorial representation of the separation or release of the cursor icon 402*ja* from the trailing message 408*j* as shown by released cursor icons 402*jb*, 402*jc*, 402*jd* and 402*je*. The separation is achieved by, e.g., simultaneously depressing a key (e.g., a CTRL key) or a combination of keys (e.g., CTRL and Shift keys) and moving the cursor icon 402*ja*.

Trailing message 408*k* illustrates how cursor icon 402*ka* after release can be placed onto the hyperlink message 418*k* of message 404*k* and can be clicked-on in order to access directly a web site linked to the message 404*k*, as illustrated using cursor icons 402*ka*, 402*kb*, 402*kc*, 402*kd*, 402*ke*, 402*kf*, 402 *kg*, 402*kh*, 402*ki*, 402*kj*, 402*kk* and 402*kl*. Cursor icon 402*ka* can be "unreleased" by letting go of the key combination that caused release to occur.

FIG. 4C illustrates an example pictorial representation 430 of how a user can link to a hyperlink included as part of a message 404*l* included on a cursor pointer 402*l*. Cursor pointer 402*l* when moved from cursor position 408*l* to cursor position 408*m* can change its message contents as shown with cursor icon 402*m* having message 404*m*, image 406*m* and a hyperlink 418*m*. Specifically, FIG. 4C illustrates how a link 418*n*, for example, can use a message 402*o*, which can be of an identical size, shape and content which can then be used to select a hyperlink 418*w* by placing the cursor pointer (i.e. 402*v*) over hyperlink 418*w* to allow selection of the hyperlink 418*w*. Normally, message 404*l* would move in synchronization with the cursor icon 402*l* from cursor position 408*l* to 408*n*.

The cursor icon 402*l* is the mouse pointer that can be used on any Web Browser to indicate the position of a control device such as a mouse. The cursor icon 402*l* can be an arrow controlled by the movement of the mouse. The cursor icon 402*l* can include a graphic image displayed as a mouse pointer in an operating system such as, e.g., Windows. These images can also be stored as cursor files (such as, e.g., ".cur" or ".ani" file types). Cursor icons 402*m* and 402*n* can display enlarged versions of the cursor icons at cursor positions 408*m* and 408*n*, messages 404*m* and 404*n* and image 406*m* and 406*n* for illustrative purposes only. Images 406*m*, 406*n* and 406*o* can in one embodiment include a distinctive shape. Examples of distinctive shapes can include a shape of the cursor icon such as a stop sign, a geometric polygon, a corporate logo, a product logo and a trademarked shape.

In one embodiment of the invention, an image 406*o* identical (or different) in size, shape and content to the cursor icon can be created. In order to create the ability to "point and click" on the image 406*n*, the user can depress a key or combination of keys in order to release the cursor icon 402*o* from the image 406*n*.

Cursor icon 402*o* can be released from message 406*n* on cursor icon 402*n* at cursor position 408*n* enabling the user to move cursor icon 402*o* from cursor position 408*n* to 408*v*, over image 406*w* and hyperlink 418*w*. Cursor icon 402*o* can move from positions 408*o* through positions 408*p*, 408*q*, 408*r*, 408*s*, 408*t* and 408*u* to position 408*v*. FIG. 4C shows the separation or release of the cursor icon 402*o* from the image 406*n*. The separation can be achieved by simultaneously depressing a key, such as CTRL, or a combinations of keys such as, e.g., CTRL+Shift keys, and moving the cursor icon 402*o* from position 408*o* to another position such as 408*v*.

At this point, the cursor icon 402*v* can be placed onto the hyperlink 418*w* and can be clicked in order to access directly a web site linked to the hyperlink 418*w*. Thus, in one embodiment, the hyperlinked information can be accessed using a key or a combination of keys to release the cursor to link to an instantly created message which can be identical (or different) in size and shape to the cursor icon. Instructions can explain to the user how to select a hyperlink to an additional site or to link to more detailed information about the message.

It will be apparent to those skilled in the art that image 406*w* can be in the same position as image 406*n*. In addition to enabling the user to select a hyperlink, an additional link can be provided to enable a user to view an enlarged message which can provide more detail using an option to view a more detailed version of the trailing message without needing to move to another web page, e.g., by clicking with the cursor icon on a "View More Details" hyperlink. If the user selects the "View More Details" hyperlink then a more detailed version of the trailing message (i.e. a larger Window of the Message) can be displayed without moving the user to another web page.

In one embodiment, cursor icons can also be shown in the form of, for example, a product logo, a corporate logo, or a trademarked shape or design. In another embodiment of the invention, a cursor icon 402*l* can be modified to create a cursor icon 402*x* in the shape of a product logo, a corporate logo or a trademarked shape, and an image 406*x* can be created that can be identical (or different) in size, shape and content to the cursor icon 402*x*. In order to create the ability to click on the image 406*x*, the user can press a key or combination of keys to release a cursor icon 402*y* to enable cursor icon 402*y* to click onto image 406*x* or a hyperlink 418*x*.

Figure 5A:
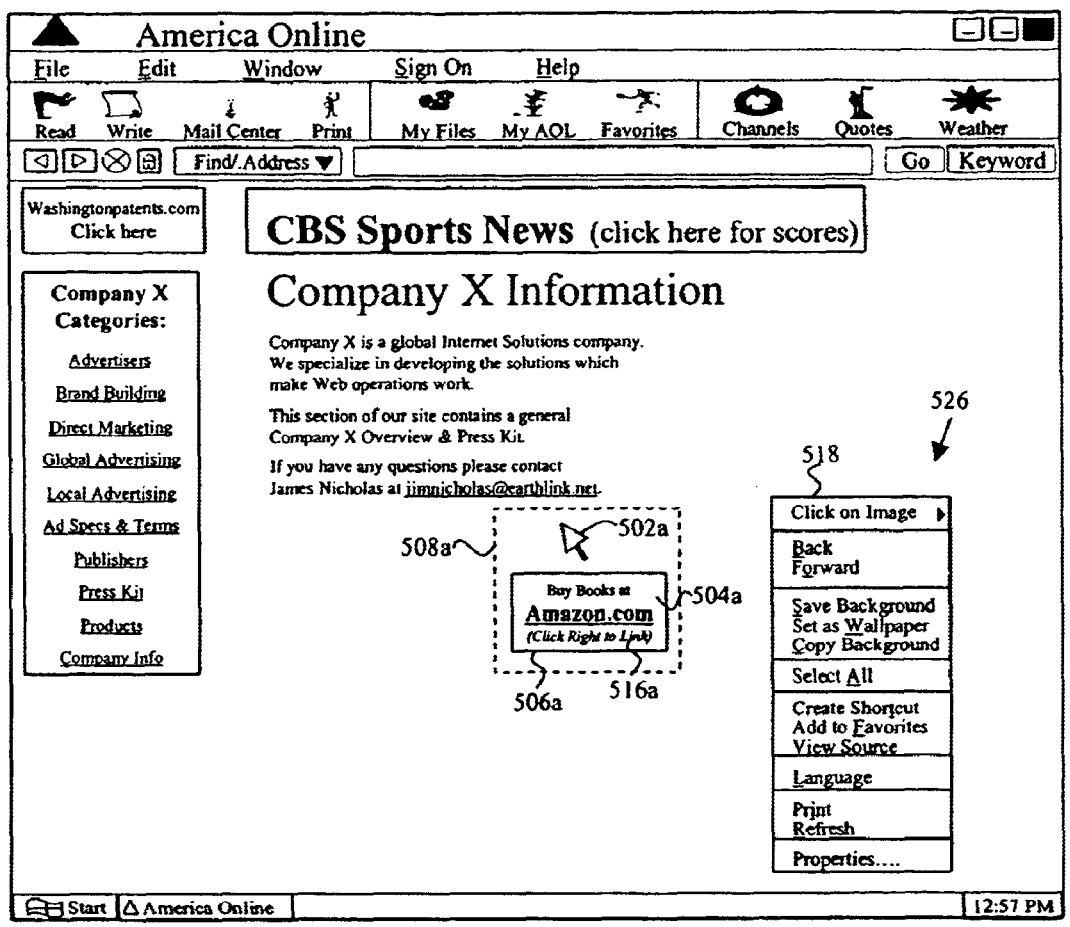
FIGS. 5A and 5B illustrate an example pictorial representation of user selecting a link to a message hyperlink website.
Figure 5B:
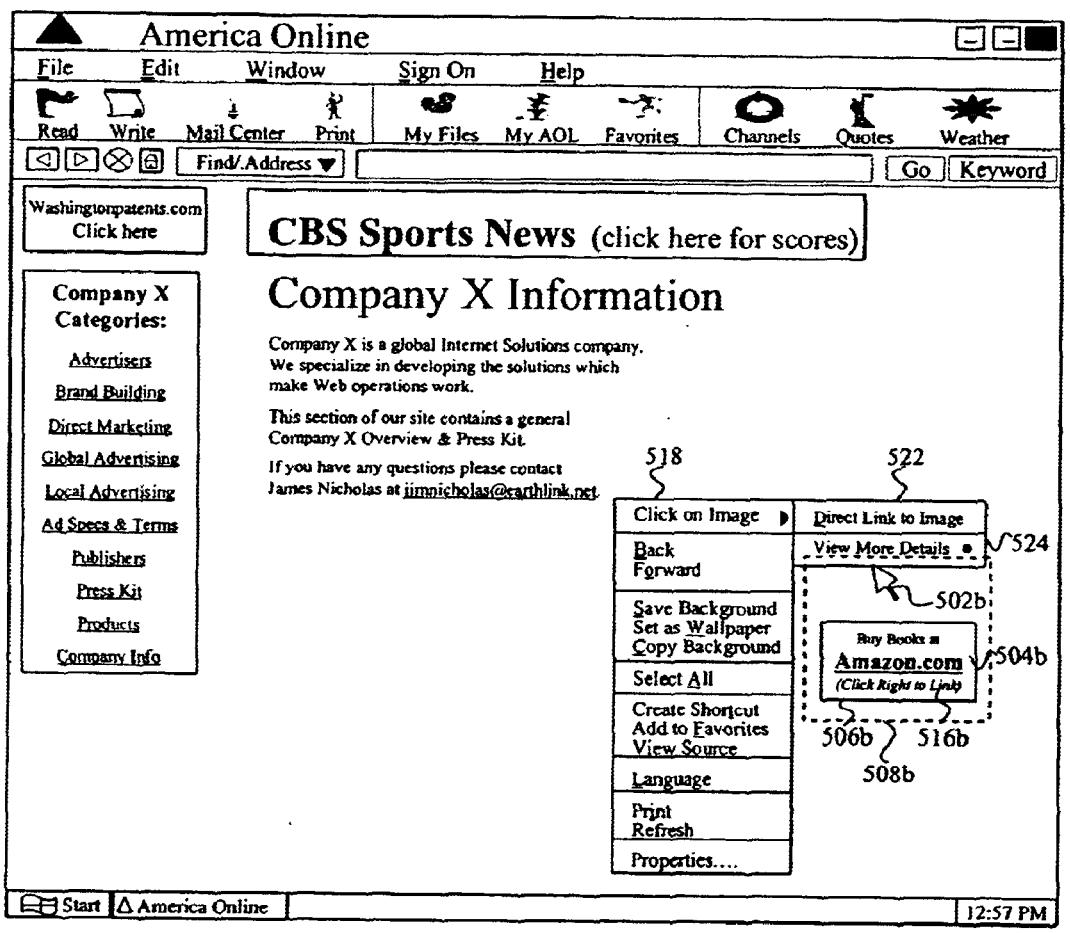

FIGS. 5A and 5B illustrate another method of linking to a hyperlink in a message such as, e.g., a trailing message or a message presented on a cursor icon. The hyperlinked information can be accessed by the user using a control menu by clicking on the right hand button of the mouse control. The user can then select a specific command menu item configured for this function. Specifically, FIG. 5A depicts a web page 500 illustrating an example pictorial representation of a user selecting a hyperlink contained in a trailing message 508*a*. Example trailing message 508*a* includes a mouse cursor icon 502*a*, message 504*a*, image 506*a*, and instructions 516*a* indicating how to link to the site contained in message 504*a* of the trailing message 508*a*. It will be apparent to those skilled in the art, that a cursor presenting a message such as cursor icon 402*m* having message 404*m* and hyperlink 418*m* shown in FIG. 4C can also use the method described in FIGS. 5A and 5B.

Referring again to trailing message 508*a*, the user can be prompted by instructions 516*a* included in the message 504*a*. FIGS. 5A and 5B illustrate a method of linking to a hyperlink using a "Click Right to Link" instruction 516*a* to instruct the user to "click" the right hand mouse button on the screen bringing up a standard control menu action list which can be configured to include a "Click on Image" menu item 518, preferably placed at the top of the Control Menu. The example method can use a specific command menu item, placed on a browser's or operating system's standard control menu action list for the Internet browser. The specific command menu item can allow a user to directly access and use a trailing message (TM) 508*a* (shown) or a cursor 408*m* (shown in FIG. 4C) as a hyperlink.

Accordingly, one way to use a trailing message as a link can be to have the user access the control menu by clicking on the right hand button of the mouse. The user can use a set of instructions placed on the trailing message in order to easily perform this function. In this example, the user can see the instruction "Click Right to Link." Once the control menu is accessed by clicking on the right hand button on the mouse, the user can select the command menu item in the control menu action list that can allow the user to access and use the trailing message as a link. This access command menu item can be placed on the control menu action list. The menu 526 can be a standard Internet browser control menu action list.

Referring to FIG. 5A, the command "Click on image" 518 of control menu action list 526 can preferably be placed on the first space (i.e. "at the top") of the control menu action list. This menu item can include a feature providing the user an ability to "click on" the trailing message 504a. FIG. 5B depicts page 520 illustrating how a user can be provided with instructions 516b within a message 504b, of trailing message 508b to communicate to the user how to directly access and use the trailing message as a link, e.g., by clicking with cursor icon 502b on a "Direct link to image" menu item 522.

When a user selects the "Click on image" command menu item 518, the user can be provided with options, such as, e.g., "Direct link to image," 522 and "View More Details" 524. If the user fails to choose an option to the right of the "Click on image" 518 command menu item and quickly releases the cursor icon 502a on the general command menu item 518, then the menu can be configured to provide that the user automatically can access the link associated with the trailing message. This is possible since the "Click on image" menu item 518 can be preset to default to the "Direct link to image" 522 menu item command. If the user selects this option, then the download period to the linked web page can begin.

If the user does not quickly release the "Click on image" command menu item 518, then the user can have an option to select a "Direct link to image . . ." command menu item 522 or "View More Details . . ." command menu item 524.

Figure 6:
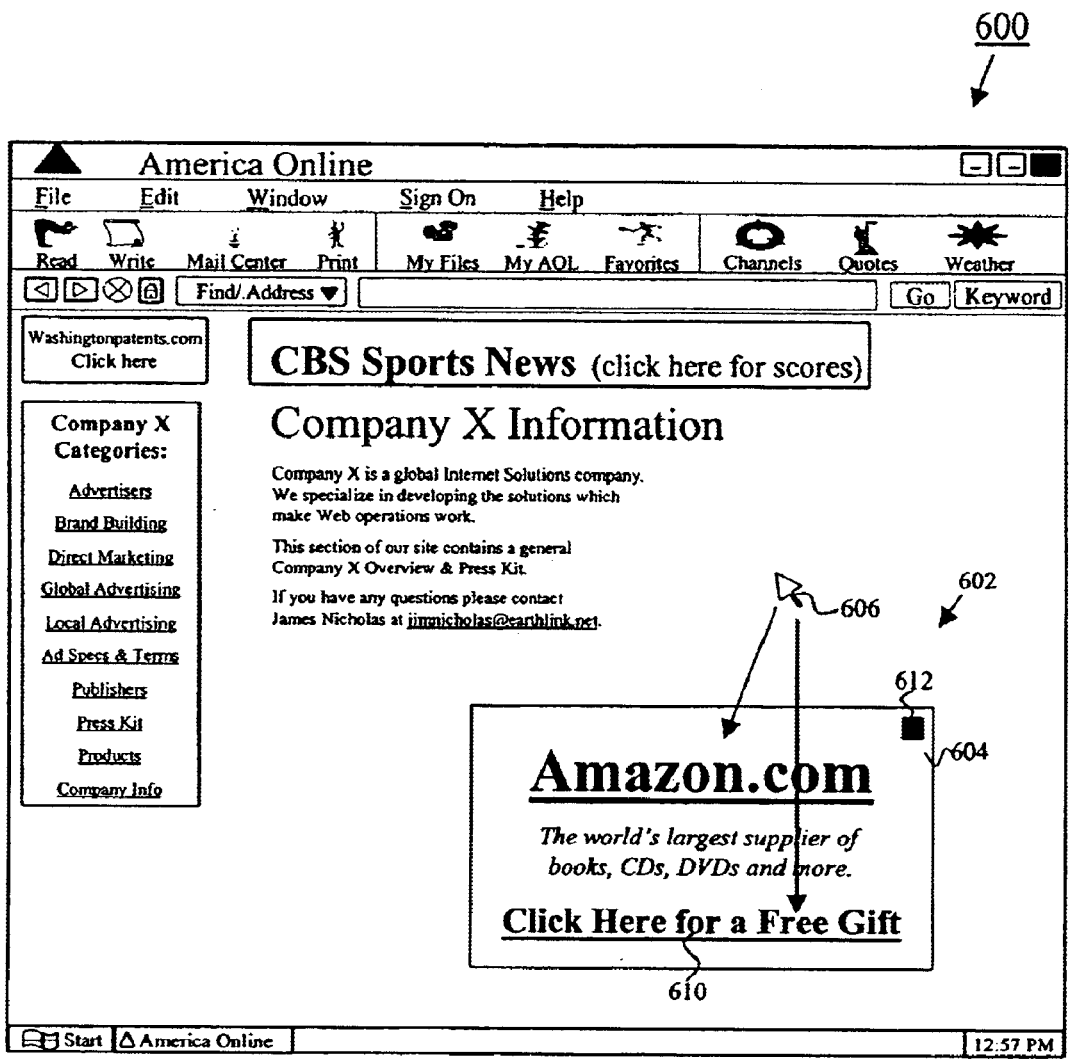
FIG. 6 is an example pictorial representation of a more detailed version of a message that has been released from a cursor thereby enabling a user to use the cursor icon.

This system can also provide the user with an option to view a more detailed version of the trailing message 602 (shown in FIG. 6) without needing to move to another web page, e.g., by clicking with cursor icon 502b on a "View More Details" menu item 524. FIG. 6 illustrates how this more detailed version 602 of message 504b can provide the user with an additional opportunity to directly access and use the trailing message 602 as a hyperlink. If the user selects the "View More Details" command menu item 524, then a more detailed version of the trailing message 602 (i.e. a larger Window of the Message) can be displayed without moving the user to another web page.

FIG. 6 illustrates a general example of a more detailed message 602 of the trailing message 508. When the user selects the "View More Details" command menu item 524, the control menu can disappear and the message 604 can be released from the cursor icon 606 (i.e. making the cursor icon 606 free for "clicking" on any link 608, 610 included in the message 604). If the user wants to use this more detailed message 602 as a hyperlink to another web page, then the user can click on an active link 608, 610 (i.e. any underlined item) within the more detailed message 602.

If the user does not want to access a link on this message 604, then the user can click on the cancel box 612 located in the upper right hand corner of the message display. If the user decides to cancel this more detailed message 602, then the original cursor icon 502b and original message 504b can return to their original prior standard format. In one embodiment the cancel button can close the more detailed message 602, in another embodiment, the cancel button can "unrelease" the message, placing the message back in the form it was in prior to release, and in yet another embodiment, a new message can be presented to the user.

Figure 7:
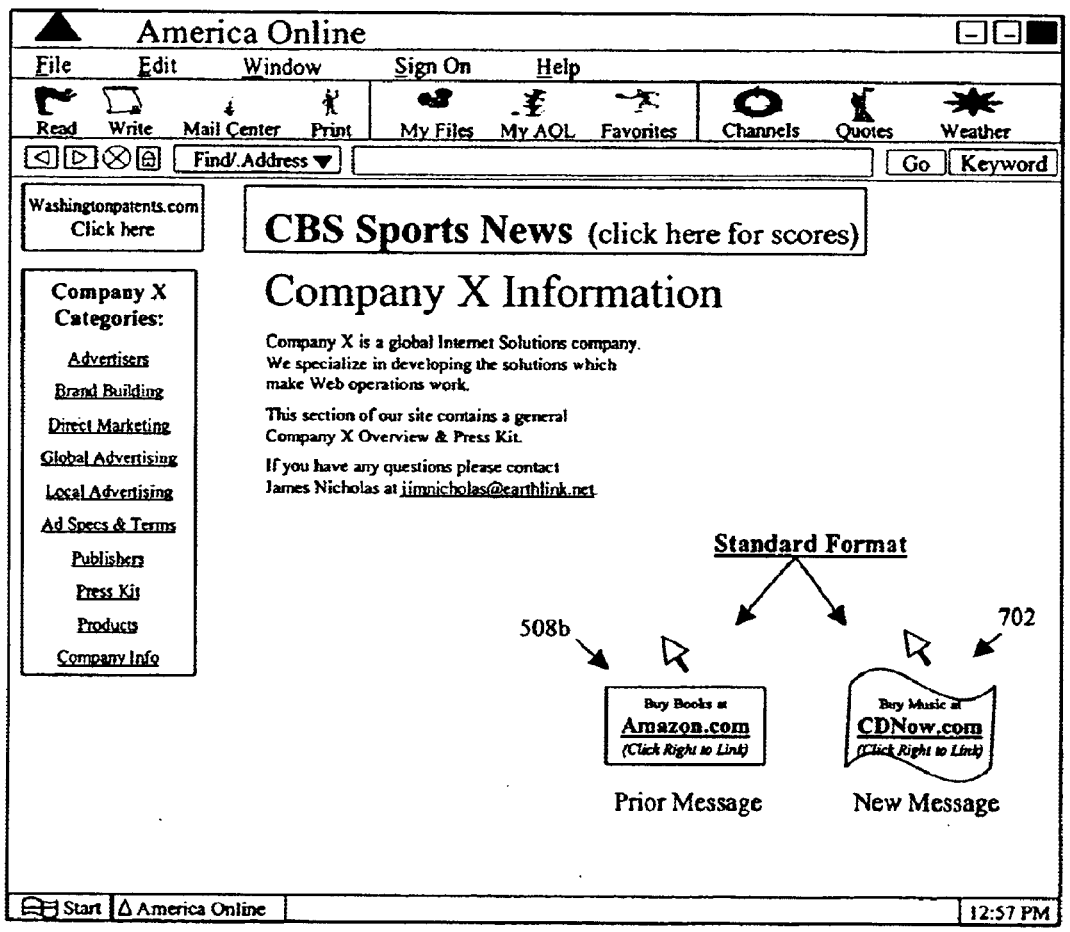
FIG. 7 is an example pictorial representation of a changing trailing message.

Upon cancellation, as depicted in FIG. 7, message 602 can be replaced by a trailing message 508b or message 602 can be replaced by a new trailing message 702. The cursor icon and trailing message can return to their original standard format. It will be apparent to those skilled in the art, that if the original standard format of the cursor icon is that shown as cursor 402m in FIG. 4C, then message 604 can return to the original standard format of cursor icon 402m having message 404m upon cancellation.

Standard example methods that can provide Internet users with direct access to links include, e.g., a primary and secondary method. Using the primary method, users can open links by placing the cursor icon directly over Internet hyperlink images or text and then "clicking" directly on such linked information using a left hand button of the mouse. This method can be referred to as the standard Internet "point and click" method. Using the secondary method, users can open links by placing the cursor icon directly over Internet hyperlink images or text and then can perform two steps. First, the control menu action list can be accessed by clicking on the right hand button of the mouse. Second, scrolling down to the corresponding command menu item within the control menu action list to the selection that provides access to the link. This method is not the standard method used by most Internet users since it could require additional steps than the primary method.

In order to open a link, the user can place the cursor icon over a hyperlink image or underlined text. Once the cursor icon is placed over the hyperlink image or underlined text, the user can click on the left hand button of the mouse control in order to proceed to another web page. This is the standard "Point and Click" method used by the majority of Internet users. In order to open a link, the user can place the cursor icon over a hyperlink image or underlined text.

Once the control menu is accessed by clicking on the right hand button on the mouse, the user can select the command in the menu selection that allows the user to open the selected link. In this case, the user can select "Open Link" in order to access the link and proceed to another web page. This method is rarely used by Internet users since it can require additional steps beyond the simple "point and click" procedure.

Figure 8A:
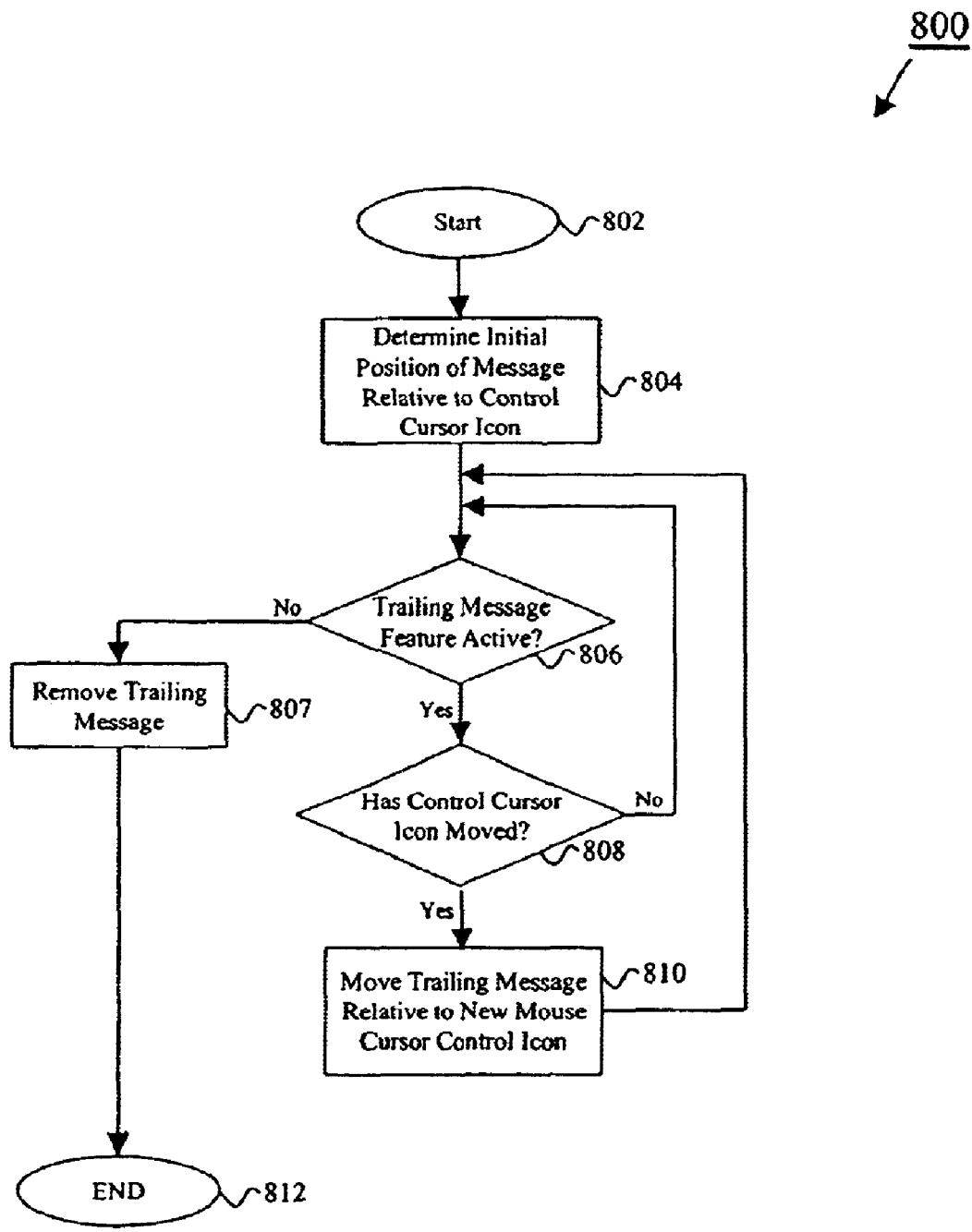
FIGS. 8A and 8B depict flow diagrams of program steps to correlate the movement of the message with the movement of the cursor icon which can be used, for example, to remove from, reorient, resize or reposition the message on, the display screen when it would be likely to distract the user.

Referring now to FIG. 8A, it includes an example flow diagram 800 beginning with a step 802, which can continue immediately with a step 804. In step 804, an initial position of a trailing message relative to a position of a control (e.g., mouse), can be determined. From step 804, flowchart 800 can continue with step 806. In step 806, it is determined whether a trailing message feature is active, and if it is, then flowchart 800 continues with step 808, and if not then, the trailing message can be removed in step 807 and flowchart 800 can end with step 812. In step 808, it is determined whether the position of the control position icon (i.e. mouse) has moved, and if so, then flowchart 800 can continue with step 810, and otherwise, it can continue with step 806. In step 810, the trailing message can be moved to a new position relative to the new position of the position icon. From step 810, flowchart 800 can continue with step 806.

Figure 8B:
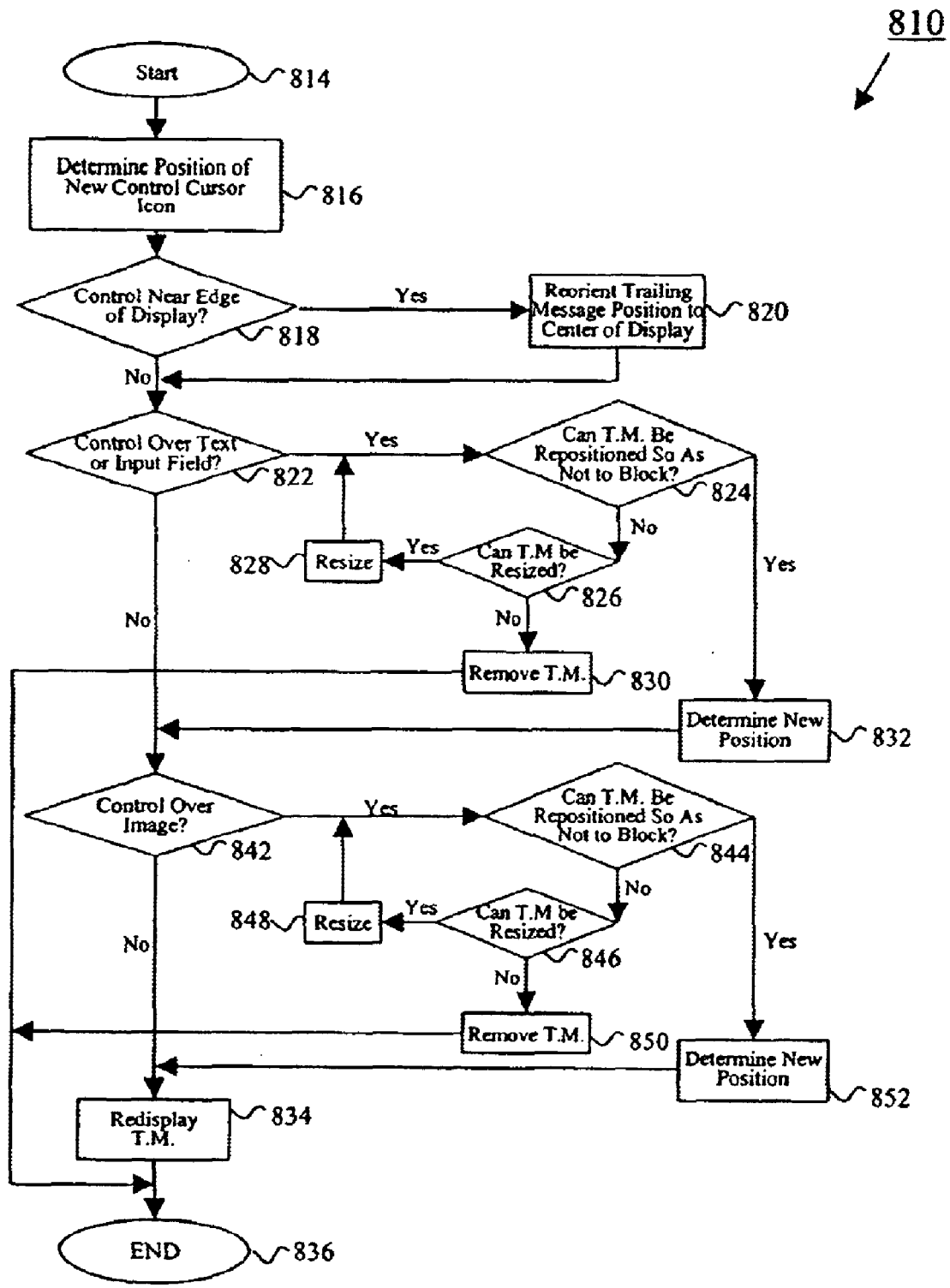

Referring now to FIG. 8B, it includes an example flow diagram 810, providing an example detailed process of performing step 810 of FIG. 8A, beginning with a step 814, which can continue immediately with a step 816. In step 816, a new position of a control position icon (e.g., mouse), can be determined. From step 816, flowchart 810 can continue with step 816. In step 816, it can be determined whether the control position icon has been positioned near an edge of the display screen or outside the confines of a web site, and if it has, then flowchart 810 can continue with step 820, and if not, then flowchart 810 can continue with step 822.

In step 820, the position of the trailing message can be reoriented to the center of the display screen, and flowchart 810 can continue immediately with step 822. In step 822, can be determined whether the control position icon has been positioned over a text or input field, and if so, then flowchart 810 can continue with step 824, and if not, then it can continue with step 842. Step 822 can also determine whether the trailing message will overlap the text or input field. In step 824, it can be determined whether a trailing message can be repositioned so as not to block the text or input field, and if so, then flowchart 810 can continue with step 832, and if not, then it can continue with step 826.

In step 826, it can be determined whether the trailing message can be resized so as not to block the text or input field, and if so, then flowchart 810 can continue with step 828, and if not, then it can continue with step 830, which can remove the trailing message and can end immediately with step 836. In step 828, the trailing message can be resized and flowchart 810 can continue with step 824. In step 832, a new position can be determined for repositioning the trailing message so as not to block the text or input fields, and flowchart 810 can continue immediately with step 842.

In step 842, can be determined whether the control position icon has been positioned over an image, and if so, then flowchart 810 can continue with step 844, and if not, then it can continue with step 834. Step 842 can also determine whether the trailing message will overlap the image. In step 834, the trailing message can be redisplayed and flowchart 810 can continue by immediately ending with step 836. In step 844, it can be determined whether a trailing message can be repositioned so as not to block the image, and if so, then flowchart 810 can continue with step 852, and if not, then it can continue with step 846.

In step 856, it can be determined whether the trailing message can be resized so as not to block the image, and if so, then flowchart 810 can continue with step 848, and if not, then it can continue with step 850, which can remove the trailing message and can end immediately with step 836. In step 848, the trailing message can be resized and flowchart 810 can continue with step 844. In step 852, a new position can be determined for repositioning the trailing message so as not to block the image, and flowchart 810 can continue immediately with step 834 which redisplays the trailing image and ends with step 836.

Figures 9A, 9B, 9C:
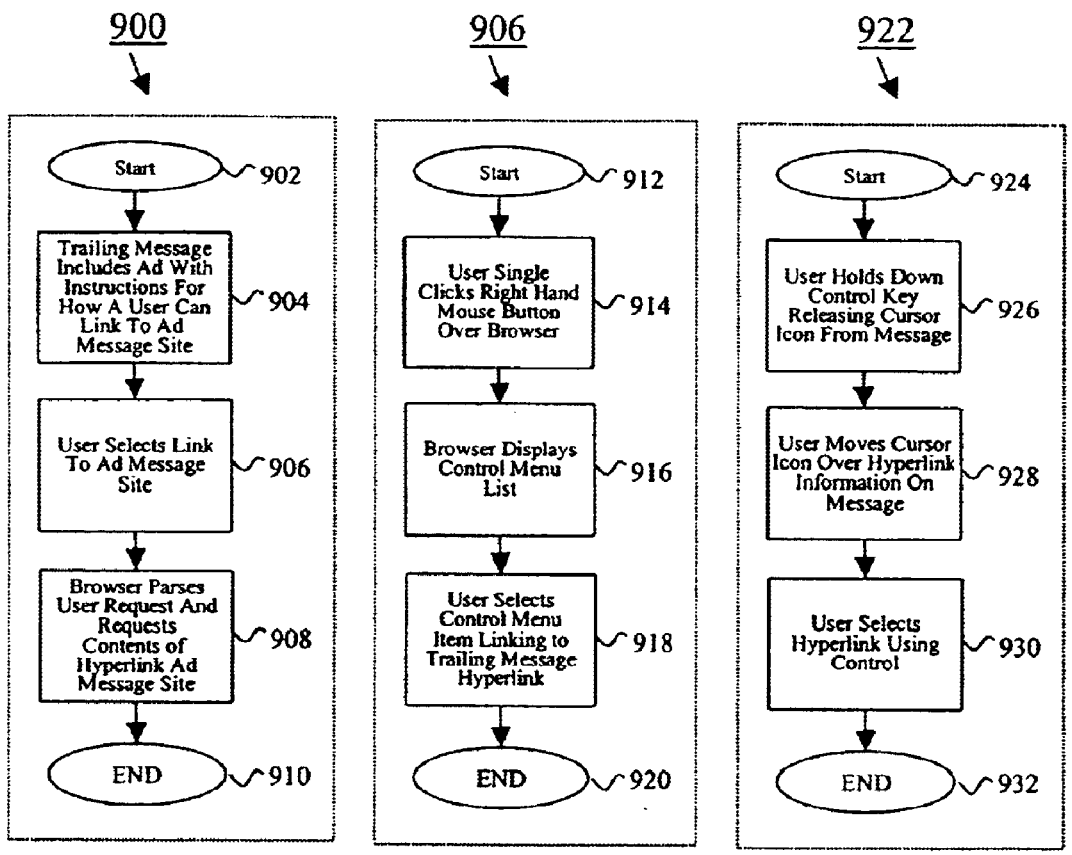
FIGS. 9A, 9B and 9C depict flow diagrams of program steps to allow the user to link to a message.

FIG. 9A includes a flowchart 900 which begins with step 902 and can continue immediately with step 904. In step 904, a trailing message including an advertisement with instructions for how a user can link to the ad's message web site, is provided. From step 904, flow diagram 900 can continue immediately with step 906. In step 906, the user can select a link to an ad message site. From step 906, flow diagram 900 can continue with step 908. In step 908, a browser can parse a user request and can request the contents of a hyperlinked ad message web site. From step 908, flow diagram 900 can end with step 910.

FIG. 9B includes a more detailed flowchart of step 906 which begins with step 912 and can continue immediately with step 914. In step 914, the user single "clicks" a right hand mouse button over the displayed browser. From step 914, flow diagram 906 can continue immediately with step 916. In step 916, the browser can display a control menu list of menu items. From step 916, flow diagram 906 can continue with step 918. In step 918, the user can select a control menu item linked to a trailing message's hyperlink. From step 918, flow diagram 906 can end with step 920.

FIG. 9C depicts an alternative embodiment of step 906, including a more detailed flowchart of step 906 which begins with step 924 and can continue immediately with step 926. In step 926, the user can, e.g., depress the control key so as to release the cursor icon from the message. From step 926, flow diagram 922 can continue immediately with step 928. In step 928, the user can move the cursor icon using the control (e.g., mouse) until it is placed over the location of a hyperlink within the message. As is well known in the art, the cursor pointer can change its shape to indicate that it is above hyperlink information such as a hyperlink image or text. From step 928, flow diagram 922 can continue with step 930. In step 930, the user can select a hyperlink using the selection button of the control, indicating the hyperlink information which is desired. From step 930, flow diagram 922 can end with step 932.

Figure 10:
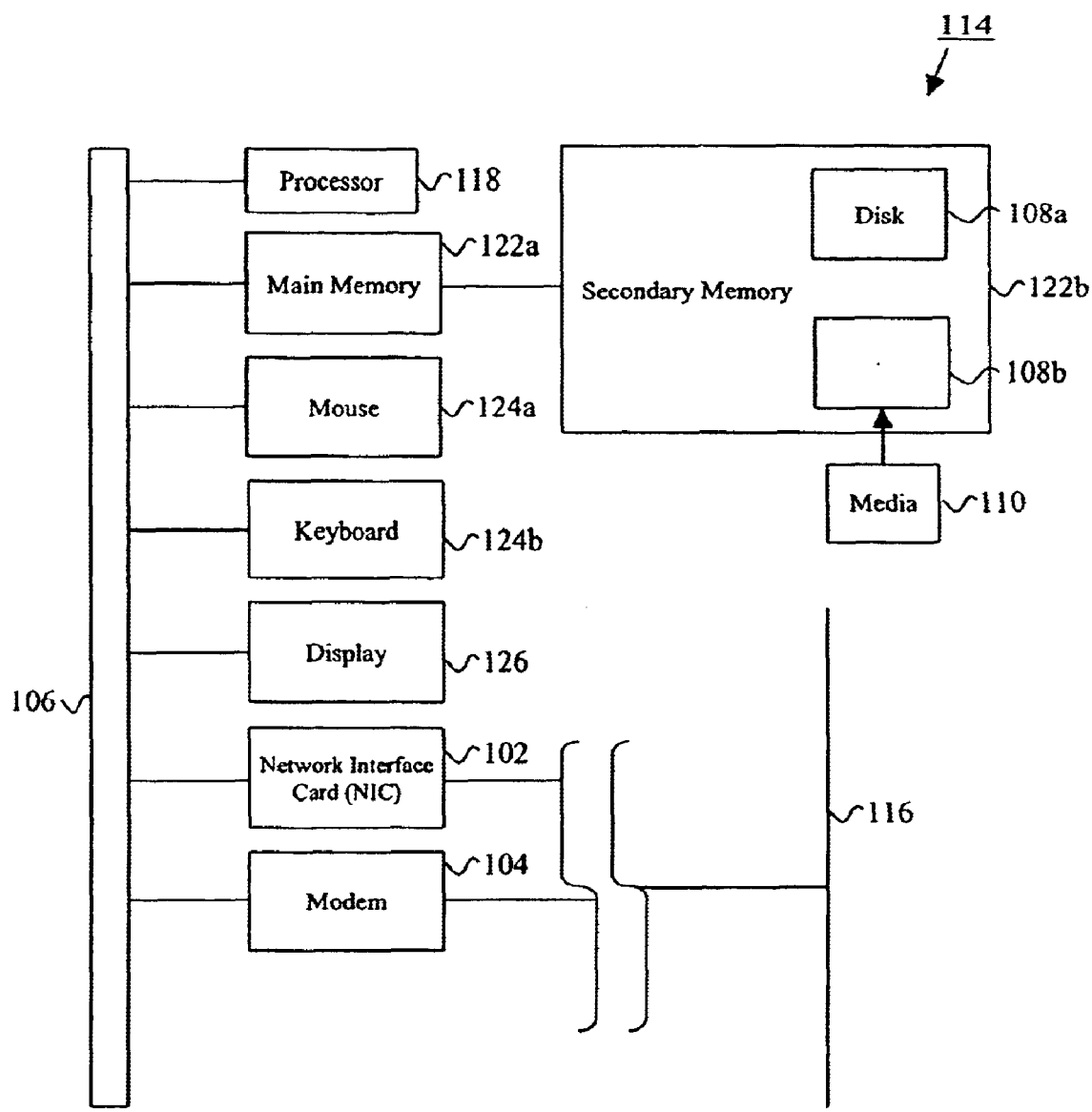
FIG. 10 depicts an example embodiment of the client computer of the present invention.

FIG. 10 depicts an exemplar client computer 114 computer system which can alternatively be another type of electronic device. Other components of the invention, such as server computers 112a–112c, could also be implemented using a computer such as that shown in FIG. 10. The computer system 114 can include one or more processors, such as processor 118. The processor 118 is connected to a communication bus 106. Client computer 114 can also include a main memory 122a, preferably random access memory (RAM), and a secondary memory 122b. The secondary memory 122b includes, for example, a hard disk drive 108a and/or a removable storage drive 108b, representing a floppy diskette drive, a magnetic tape drive, a compact disk drive, etc. The removable storage drive 108b can read from and/or write to a removable storage unit 110 in a well known manner.

Removable storage unit 110, also called a program storage device or a computer program product, represents a floppy disk, magnetic tape, compact disk, etc. The removable storage unit 110 can include a computer usable storage medium having stored therein computer software and/or data, such as an object's methods and data. Client computer 114 also can include an input device such as (but not limited to) a mouse 124a or other pointing device such as a digitizer, and a keyboard 124b or other data entry device. Also shown are a display 126, a network interface card (NIC) 102, a modem 104, and network 116.

Computer programs (also called computer control logic), including object oriented computer programs, are stored in main memory 122a and/or the secondary memory 122b and/or removable storage units 110, also called computer program products. Such computer programs, when executed, enable the computer system 114 to perform the features of the present invention as discussed herein. In particular, the computer programs, when executed, enable the processor 118 to perform the features of the present invention. Accordingly, such computer programs represent controllers of the computer system 114.

In another embodiment, the invention is directed to a computer program product comprising a computer readable medium having control logic (computer software) stored therein. The control logic, when executed by the processor 118, causes the processor 118 to perform the functions of the invention as described herein. In yet another embodiment, the invention is implemented primarily in hardware using, for example, one or more state machines. Implementation of these state machines so as to perform the functions described herein will be apparent to persons skilled in the relevant arts. In yet another embodiment, the invention is implemented using a combination of hardware and software.

In yet a further aspect, the invention provides a method for enabling a positional identifier (e.g., a cursor icon) to interact with an animated element in a trailing message on a display screen to become an interactive part of an application program linked to the animated element. The method enables users to integrate enhanced notification, messaging and data functions into any application program or any computing environment without incurring substantial redevelopment costs. Significantly, the method notifies users of events or other data without the use of a dialog box, or other such mechanisms, that utilize computing resources which interfere with the continuous operation of running applications or other network-based services. Importantly, the method enables the user to continuously utilize an application or service while concurrently receiving new information or data. In this way, the present invention enables users to continue working until they choose to respond to such messages or data.

However, when a data event occurs that triggers the delivery of new information into the trailing message area and its display on the screen of a particular electronic device, the present invention permits users to respond immediately by providing direct access to the original application that triggered the notification or message. The present invention thus facilitates a two-way, interactive notification, messaging and data capability that not only notifies a user of a specific event, but also enables the user to respond immediately to the application that triggered the data communication by directly accessing the triggering application through the trailing message. In this respect, the present invention is utilized as an interactive data "receptacle" or utility or notification agent that runs in the background of any electronic device and can be profiled to accept any kind of aggregated data to facilitate the flow of information and data within any electronic computing environment or other networked environment.

In one aspect of the present invention, the user can directly access the triggering application by right-clicking a mouse device to activate a command menu including a direct link to the triggering application. In a further aspect, the user can directly access the triggering application by depressing a key or combination of keys on a keyboard device. In still a further aspect, the user can directly access the triggering application by depressing a portion of a display screen that is responsive to a user's touch. In yet a further aspect, the user's voice can be used to directly access the triggering application.

The trading of stocks is a good example. Consider, for example, a user currently working on a presentation in Microsoft's PowerPoint®. The user wishes to buy 100 shares of IBM stock, but only when the price of IBM stock goes down to $100/share (i.e., a time-critical event). Rather than having to constantly monitor the price of IBM stock by visiting, for example, E-Trade's® real-time stock quote service, and enduring constant work interruptions, the user could simply integrate the enhanced alert notification capability of the present invention into PowerPoint® and E-Trade's® stock quote service.

Thereafter, if and when the price of IBM stock dips to $100/share, the quote service generates an alert notification message that would immediately appear on the user's presentation, the message being displayed in relation to the cursor so as to track any user-initiated movements of the cursor. The user could then, for example, touch a portion of the display screen where the message appears and the user is transported directly to the E-Trade's® trade execution screen where the user could proceed to purchase the 100 shares of IBM stock.

The updating of new IT repository information is another good example. Consider, for example, a high-level technical executive (e.g., CIO) working in a complex Network and Systems Management (NSM) environment. The user wishes to receive notifications regarding competitive data, vendor agreements, NSM data, or changes in any other type of specified repository IT data. Rather than having to continuously search through various information repositories, or continuously keep a specific information console (e.g., window) displayed in order to monitor current activities and endure constant work interruptions through the display of notification dialog boxes, the user could simply integrate the enhanced notification and messaging capability of the present invention into the NSM environment (e.g., an events correlation engine or manager) and the other applications where the relevant data resides. The present invention would enable the user to conveniently receive and access the relevant data without enduring any applications or services interrupt and more importantly, allow the user to respond to the displayed data when the user chooses to do so.

Another example of the use of this aspect of the present invention is in the context of interactive collaboration and knowledge sharing computing environments. The present invention could notify or alert a current participant engaged in an interactive session (e.g., remote document review, selling presentation, etc.) in progress with multiple users or participants that a new mission-critical event (e.g., an urgent Instant message or telephone call is being transmitted) or change in information (e.g., a particular document has been revised without proper authorization) has occurred that requires instant notification of a specific user (e.g., the session manager) but without causing any interruptions to the ongoing interactive work session. The notified user could then, for example, right-click the mouse to activate a command menu having, within, an option to accept the new instant message or telephone call and activate the triggering notification application.

Another example of the use of this aspect of the present invention is in the context of interactive video gaming. The present invention could notify or alert current players of a game in progress that a new player(s) would like to enter without causing any interruptions or stoppages to the game. Any one of the current players could then, for example, depress a key on a game console to activate a command menu having, within, an option to accept or reject the new player.

In yet another example, a network administrator using the present invention could be instantly alerted to any given problem on the network regardless of the application that the administrator may be working in. If the problem is minor, the administrator could ignore the alert notification and simply continue working without interruption. However, if it is a major problem that requires immediate and instant attention, the administrator could, for example, speak a predetermined phrase (e.g., "show me the problem") to directly access the application where the problem resides or to the application that triggered the alert notification.

In still a further aspect, the present invention is implemented in a WAP enabled device or appliance. Accordingly, the present invention can provide any such device or appliance with real-time alert notification, messaging and data capabilities to facilitate two-way communication and transaction functionality anywhere, any time.

In yet a further aspect, the cursor icon of the present invention comprises a highlighted area of the screen moved in relation to at least one of a mouse, a remote control device, a directional key, and a selector. The remote control can include, for example, a remote control for a television. Such a remote control device could also use a pointer mechanism to allow the viewer to navigate the TV screen and "double-clicking" selected options to activate or access information (much like a desktop mouse pointer), rather than using a highlighted area to navigate a command menu.

As the development and deployment of the Cable TV Modem or Direct Link to the cable network become more prevalent more resources will be available to the viewing public. The television has become a "standard" in most American homes and has become a true multi-use device. The present invention may be used in conjunction with game consoles with telephone modems, cable modems and direct TV interfaces, as well as TV set-top devices that connect the viewer directly to the Internet or Public Switched Telephone Network (PSTN).

Specifically, by integrating current services in the picture-in-picture technology (or another designated location such as the standard on-screen menu) alert notification can be delivered to the TV to alert the viewer to various messages or events that the viewer may otherwise miss. The user could then choose to either respond or not respond by using at least one positional indicator (e.g., an arrow) to navigate an associated menu. For example, the alert could be used to interactively notify the viewer of an emergency, connect the viewer to the appropriate emergency service and arrange for transportation out of the affected area; all with a click of the remote control unit, a directional key, or a selector.

The present invention could also operate in a telephony environment. The television, cable box, cable modem, or game console combination (any of the three with a TV) can be connected to the dial tone provider and become an extension of the telephony service the viewer currently has. Accordingly, caller ID, call blocking and other enhanced services provided by the LEC (Local Exchange Carrier) could be integrated into an alert on the TV. The viewer could be watching television when a phone call is received. An alert window could, for example, pop up on the TV in a pre-selected area with caller's ID and notify the viewer of the call type.

If the call is acceptable the viewer can either pick up a phone device or use the TV as a speakerphone to complete the call. The background program would be muted or the game could be paused, etc. If, however, the call is an unwanted intrusion (e.g., a predictive dialer "spamming" the viewer with advertisements, a blocked call, or a general nuisance call), the viewer could invoke an application that is resident on the cable box to block the call, generate a prerecorded message (e.g., "I'm sorry this call is unacceptable, please remove my name from your list") or a Dual Tone Multi Frequency (DTMF) signal to end the call. The system could then block any future calls from the same source.

The interactive alert window could be utilized in many different applications, ranging from call screening to hazard call identification (e.g., stalkers, menace callers, etc.). The next logical projection is interactive TV, gaming and education. This interactive alert window could be implemented in firmware in, for example, the TV set top box so as to be "resident" to the set top box and not a "visitor." This would allow other companies to integrate their applications into the trailing message "data receptacle".

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for displaying an image which can comprise at least one of a text and a graphic message on a display having edges and driven by an electronic device that includes a graphical user interface, including the steps of:

storing said image at an electronic device;

displaying said image in relation to a cursor icon of said graphical user interface (GUI);

moving said image as said cursor icon moves in response to user commanded movement of said cursor icon so that said image stays in relation to said cursor icon; and reorienting said image for a period of time, when at least one of said image and said cursor icon is placed over an on-screen area which is outside of the edges of the display.

2. The method of claim 1, wherein said reorienting step includes moving said image toward a center point of said GUI when said on-screen area is outside of an edge of the display.

3. A method for displaying an image which can comprise at least one of a text and a graphic message on a display driven by an electronic device that includes a graphical user interface, including the steps of:

storing said image at an electronic device, wherein said image includes instructions describing how to access hyperlinked information;

displaying said image in relation to a cursor icon of said graphical user interface (GUI); and moving said image as said cursor icon moves in response to user commanded movement of said cursor icon so that said image stays in relation to said cursor icon;

wherein said instructions direct the user to right click to activate a command menu including at least one of a direct link to content and more detailed information.

* * * * *